United States Patent [19]

Huber et al.

[11] Patent Number: 4,608,870

[45] Date of Patent: Sep. 2, 1986

[54] PRESSURE FLUID RESERVOIR

[75] Inventors: Werner Huber, Schwaikheim; Heinz Leiber, Oberriexingen, both of Fed. Rep. of Germany

[73] Assignee: Robert Bosch GmbH, Stuttgart, Fed. Rep. of Germany

[21] Appl. No.: 687,889

[22] Filed: Dec. 31, 1984

[30] Foreign Application Priority Data

Mar. 28, 1984 [DE] Fed. Rep. of Germany ....... 3411367

[51] Int. Cl.[4] .......................... G01L 7/16; G01L 9/14; G01L 19/04

[52] U.S. Cl. ........................................ 73/708; 73/745; 200/82 E; 340/60

[58] Field of Search ................ 73/708, 744, 745, 746; 340/60, 58, 52 C; 200/82 E

[56] References Cited

U.S. PATENT DOCUMENTS

| | | | |
|---|---|---|---|
| 3,703,616 | 11/1972 | Martin | 73/745 |
| 3,887,899 | 6/1975 | Kawaguchi et al. | 340/60 |
| 4,107,493 | 8/1978 | Nagara et al. | 340/624 |
| 4,181,835 | 1/1980 | Stadler et al. | 73/745 |

*Primary Examiner*—Donald O. Woodiel
*Attorney, Agent, or Firm*—Edwin E. Greigg

[57] ABSTRACT

A pressure fluid reservoir comprising a cylinder with a reservoir connection, a piston displaceable in the cylinder and non-contact switch means for indicating piston positions. Between the reservoir connection and the piston, the cylinder encloses a pressure fluid chamber, which is intended for storing a pressure fluid such as hydraulic oil, brake pressure fluid or the like. Opposite the pressure fluid chamber, the piston defines a gas chamber. The non-contact switch indicating means comprise Reed contacts, for example, and are disposed outside the cylinder such that they are longitudinally adjustable along the cylinder. Adjustment is effected by a temperature-dependent adjusting means, embodied for instance as an expansion element. Permanent-magnet actuating means, for actuating the Reed contacts in a non-contacting manner are fixed in recesses in one side of the piston. The adjusting means adjusts the Reed contacts longitudinally such that when these contacts are actuated, the same pressure (p1) in the pressure fluid chamber is indicated, regardless of the temperature of the fluid in the pressure fluid reservoir.

18 Claims, 2 Drawing Figures

PRESSURE FLUID RESERVOIR

BACKGROUND OF THE INVENTION

The invention is based on a pressure fluid reservoir having a dividing piston and a non-contact means for indicating at least one position of the dividing piston. A pressure fluid reservoir is known from German Offenlegungsschrift No. 11 88 247, the dividing piston of which apparatus controls two electrical contact switches, disposed one behind the other outside its cylinder in a longitudinal direction thereof, in a non-contacting manner. By way of example, such switches have magnetically actuatable switching contacts fused into glass tubes, which are known as Reed contacts and are available in commerce. One switch serves to switch on a reservoir charging apparatus and the other switch switches it off, whenever the isolating piston has attained a predetermined position. The shutoff ends a rise in pressure within the pressure fluid reservoir. Depending on the temperature of the pressure fluid reservoir, variably high pressures prevail therein after the shutoff. This pressure difference may be disadvantageously great, especially if the temperature of the pressure fluid reservoir fluctuates between −40° C. and +120° C., for example, as a result of the installation of the pressure fluid reservoir in a motor vehicle, where for example it may be part of a vehicle braking system. The above temperature range accordingly means there will be considerable errors in pressure indications.

OBJECT AND SUMMARY OF THE INVENTION

The pressure fluid reservoir according to the invention has the advantage that at least the particular indicating means or switch by way of which the reservoir charge pressure, for instance, is limited, is automatically adjusted such that despite varying operating temperatures, the pressure is correctly indicated.

With the provisions disclosed herein advantageous further embodiments of and improvements to the pressure fluid reservoir disclosed are attainable. One embodiment has the advantage that the adjusting means rapidly follows the temperature rise of the pressure reservoir. As a result, the pressure resistance of the pressure fluid reservoir can be better exploited, with greater reliability.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
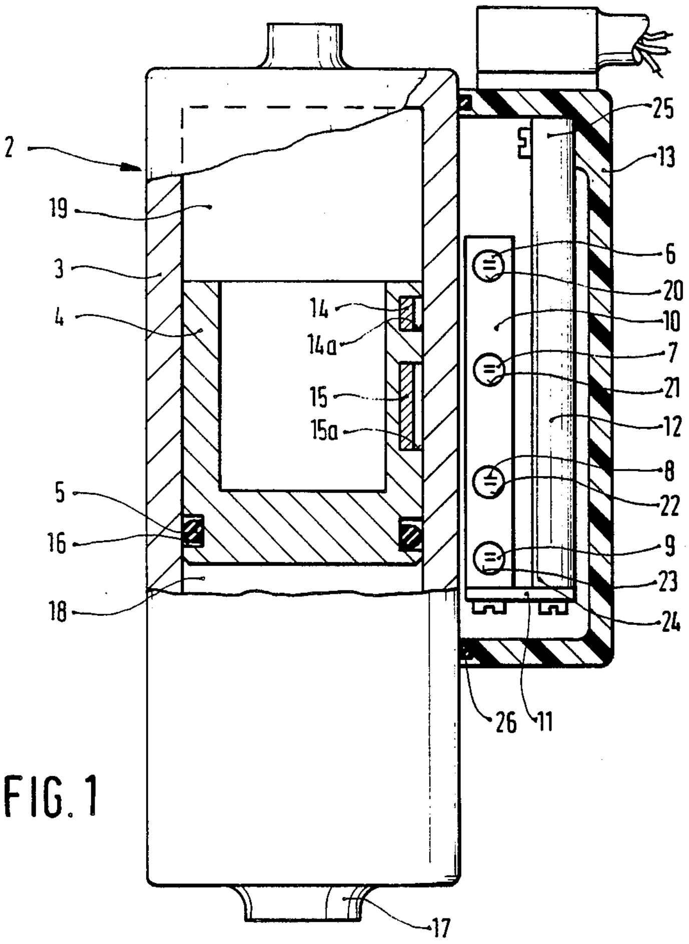
FIG. 1 shows the pressure fluid reservoir according to the invention in a partial longitudinal section.

The pressure fluid reservoir 2 substantially comprises a cylinder 3, which is open at each end, a piston 4, operative in said cylinder, a piston O-ring seal 5, surrounding said piston, piston position indicating means 6, 7, 8, 9, fixed in a retaining device 10, which is secured at one end to a securing strap 11, which is secured to one end of an adjusting means 12, which is secured within a protective housing 13. Two actuating means 14 and 15 such as axially spaced permanent magnets are situated in cut-out recesses in the side wall of the piston 4.

The piston 4 is substantially cup-shaped and is longitudinally displaceable inside the cylinder 3. The piston seal 5 is laid in an annular groove 16 machined into the piston 4 and rests in a prestressed manner on the cylinder wall. The cylinder 3 has a reservoir connection 17 at one end. The piston 4 defines a pressure fluid chamber 18 in the cylinder 3 beginning at the reservoir connection 17. Opposite this chamber 18, and on the opposite side of piston 4 a gas chamber 19 is formed. This chamber 19 is filled by way of example with an inert gas, such as nitrogen through connection 30 in the upper end of the cylinder 3. The gas acts in the manner of a spring upon the piston 4. The piston seal 5 prevents a loss of gas in the direction of the pressure fluid chamber 18. The actuation means 14 and 15 are embodied as permanent magnets and are laid into recesses **14*a*, 15*a* of the piston 4, which is formed of some non-magnetizable material. The cylinder 3 is also of a non-magnetizable material. The piston position indicating means 6, 7, 8, 9 are embodied for example as Reed contacts; that is, they have magnetically actuatable contacts (not shown) which are fused into glass tubes (also not shown). The indicating means 6–9 are inserted into holes 20, 21, 22 and 23, which are located in the retaining device 10. The holes 20–23 are oriented crosswise, for example, with respect to the cylinder axis. The retaining device 10 is joined via the securing strap 11 to one end 24 of the adjusting means 12. A second end 25 of the adjusting means 12 is secured in the protective housing 13. The adjusting means 12 may be embodied arbitrarily, for instance as an expansion element. Expansion elements of this kind are known in the art and comprise a sleeve, a piston protruding into the sleeve and a medium, such as liquid or liquefiable wax or gas sealed in the sleeve, which is expandable when heated. Instead of the sleeve and the piston, a bellows, such as that conventionally used in barometers, may be used. The protective housing 13 is secured to the side of the cylinder 3 and sealed off by a seal 26. The orientation of the adjusting means 12 is selected such that with increasing temperature the securing strap 11 is moved in an axial direction of the reservoir connection 17. This movement is transmitted to the retaining device 10 and accordingly to the indicating means 6–9. Air enclosed within the protective housing 13 acts as a heat transfer means between the cylinder 3 and the adjusting means 12. The temperature of the adjusting means 12 accordingly rises, whenever the pressure fluid reservoir 2 is put into operation and the temperature in the pressure fluid chamber 18 and gas chamber 19 rises as a result. Any cooling of the cylinder correspondingly effects a decrease in the temperature of the adjusting means 12, causing it to move the indicating means 6–9 along the cylinder 3 in an axial direction away from the reservoir connection 17**.

In operation of the pressure fluid reservoir as the temperature of the fluid in the reservoir increases, the pressure of the gas in the gas chamber will increase to force the piston downwardly. As the piston is forced downwardly due to temperature, the adjusting member 12 likewise moves according to the temperature to move the piston position indicators downwardly also. Therefore the piston position indicators will be adjusted in accordance with the temperature of the fluid and will therefore provide an accurate position for the piston regardless of the temperature of the fluid.

Instead of the Reed contacts, Hall elements may be incorporated in the retaining device 10. These Hall elements are then likewise controlled by means of the magnets 14, 15. Instead of the indicating means described, inductive proximity switches available on the market can naturally be used.

Figure 2:
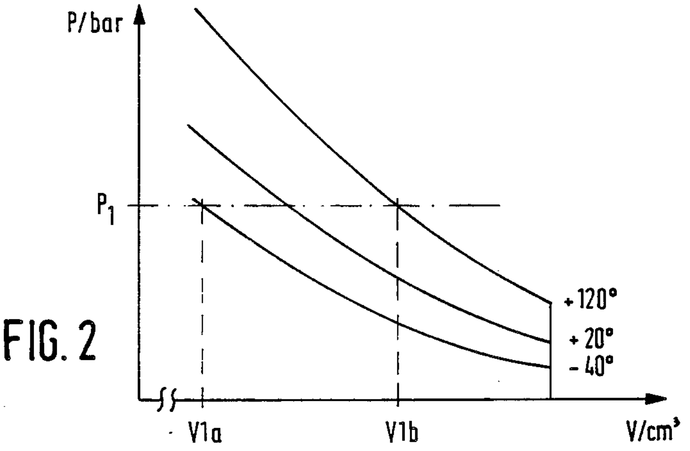
FIG. 2 is a volume/pressure diagram.

The diagram in FIG. 2 shows the relationship between different volumes V and the associated pressures p of an amount of weight of a gas enclosed in the gas chamber 19 at various gas temperatures. At a pressure p1 selected as an example, for instance the maximum permissible pressure in the cylinder 3, the various volumes V can be ascertained in accordance with the temperature. Piston positions and positions of the actuating means 14, 15 associated with these volumes V, for instance V1*a* and V1*b*, can be calculated based on the dimensions of the piston. The adjusting means 12 is dimensioned such that in accordance with temperature it orients at least that one of the indicating means 6, 7, 8 or 9 that is intended for measuring the pressure p1 toward the calculated position.

It should additionally be noted that instead of the expansion element described, some other means adjusting in accordance with temperatures, for instance a bimetallic element, may be used to effect a temperature compensation of errors in pressure indications.

The foregoing relates to a preferred exemplary embodiment of the invention, it being understood that other variants and embodiments thereof are possible within the spirit and scope of the invention, the latter being defined by the appended claims.

What is claimed and described to be secured by Letters Patent of the United States is:

1. A pressure fluid reservoir having a cylinder, a piston displaceable therein, a gas chamber in said cylinder defined by said piston and an upper end of said cylinder, a pressure fluid chamber likewise defined by said piston and a lower end of said cylinder, a reservoir connection at said lower end of the cylinder defining the pressure fluid chamber, and means operating in a non-contacting manner for indicating at least one piston position, wherein at least one of the means is disposed outside said cylinder, at least one piston position indicating means coupled to an adjusting means and disposed such as to be axially adjustable relative to said cylinder, which upon temperature changes in fluid in said pressure fluid chamber generates adjusting movements.

2. A pressure fluid reservoir as defined by claim 1, in which said at least one piston indicating means is adjustable beside said cylinder in a longitudinal direction thereof, and that said adjusting means is likewise disposed beside said cylinder and is oriented such that with increasing temperature of an expansible gas in said gas chamber, said adjusting means displaces said at least one piston position indicating means in a direction of said reservoir connection.

3. A pressure fluid reservoir as defined by claim 2, in which said adjusting means is embodied as an expansion element.

4. A pressure fluid reservoir as defined by claim 3, in which at least one permanent magnet is retained in a recess in said piston and movable therewith relative to said at least one piston position indicating means.

5. A pressure fluid reservoir as defined in claim 3, which includes more than one piston position indicating means.

6. A pressure fluid reservoir as defined in claim 5 which includes more than one permanent magnet.

7. A pressure fluid reservoir as defined by claim 2, in which at least one permanent magnet is retained in a recess in said piston and movable therewith relative to said at least one piston position indicating means.

8. A pressure fluid reservoir as defined in claim 2, which includes more than one piston position indicating means.

9. A pressure fluid reservoir as defined in claim 8, which includes more than one permanent magnet.

10. A pressure fluid reservoir as defined by claim 1, in which said adjusting means is embodied as an expansion element.

11. A pressure fluid reservoir as defined by claim 10, in which at least one permanent magnet is retained in a recess in said piston and movable therewith relative to said at least one piston position indicating means.

12. A pressure fluid reservoir as defined in claim 10, which includes more than one piston position indicating means.

13. A pressure fluid reservoir as defined in claim 12, which includes more thn one permanent magnet.

14. A pressure fluid reservoir as defined in claim 1, which includes more than one piston position indicating means.

15. A pressure fluid reservoir as defined in claim 9, which includes more than one permanent magnet.

16. A pressure fluid reservoir as defined by claim 1, in which at least one permanent magnet is retained in a recess in said piston and movable therewith relative to said at least one piston position indicating means.

17. A pressure fluid reservoir as defined in claim 16, which includes more than one piston position indicating means.

18. A pressure fluid reservoir as defined in claim 1, which includes more than one permanent magnet.

* * * * *